US007469209B2

(12) United States Patent

Chong-White et al.

(10) Patent No.: US 7,469,209 B2
(45) Date of Patent: Dec. 23, 2008

(54) METHOD AND APPARATUS FOR FRAME CLASSIFICATION AND RATE DETERMINATION IN VOICE TRANSCODERS FOR TELECOMMUNICATIONS

(75) Inventors: Nicola Chong-White, Greenwich (AU); Jianwei Wang, Killarney Heights (AU); Marwan A. Jabri, Broadway (AU)

(73) Assignee: Dilithium Networks Pty Ltd., Broadway (AU)

( * ) Notice: Subject to any disclaimer, the term of this patent is extended or adjusted under 35 U.S.C. 154(b) by 937 days.

(21) Appl. No.: 10/642,422

(22) Filed: Aug. 14, 2003

(65) Prior Publication Data

US 2005/0049855 A1 Mar. 3, 2005

(51) Int. Cl.

| | |
|---|---|
| ***G10L 19/00*** | (2006.01) |
| ***G10L 19/02*** | (2006.01) |
| ***G10L 21/00*** | (2006.01) |
| ***H04J 3/16*** | (2006.01) |
| ***H04J 3/22*** | (2006.01) |
| ***H04Q 7/00*** | (2006.01) |

(52) U.S. Cl. ....................... 704/229; 704/201; 704/230; 704/E19.011; 704/E19.022; 704/E19.049; 370/328; 370/466

(58) Field of Classification Search .......... 704/229–230
See application file for complete search history.

(56) References Cited

U.S. PATENT DOCUMENTS

| | | | | |
|---|---|---|---|---|
| 5,341,456 | A * | 8/1994 | DeJaco | 704/214 |
| 5,809,459 | A * | 9/1998 | Bergstrom et al. | 704/223 |
| 5,842,160 | A * | 11/1998 | Zinser | 704/229 |
| 5,953,666 | A * | 9/1999 | Lehtimaki | 455/439 |
| 5,966,688 | A * | 10/1999 | Nandkumar et al. | 704/222 |
| 6,226,607 | B1 * | 5/2001 | Chang et al. | 704/221 |
| 6,574,593 | B1 * | 6/2003 | Gao et al. | 704/222 |
| 7,092,875 | B2 * | 8/2006 | Tsuchinaga et al. | 704/210 |
| 2003/0105628 | A1 * | 6/2003 | Zinser et al. | 704/219 |
| 2004/0158647 | A1 | 8/2004 | Omura | |

OTHER PUBLICATIONS

Office Action dated Sep. 28, 2007 for U.S. Appl. No. 10/660,468.

* cited by examiner

*Primary Examiner*—David R Hudspeth
*Assistant Examiner*—Justin W Rider
(74) *Attorney, Agent, or Firm*—Townsend & Townsend & Crew LLP

(57) ABSTRACT

A method and apparatus for frame classification and rate determination in voice transcoders. The apparatus includes a classifier input parameter preparation module that unpacks the bitstream from the source codec and selects the codec parameters to be used for classification, parameter buffers that store previous input and output parameters of previous frames, and a frame classification and rate decision module that uses the source codec parameters from the current frame and zero or more frames to determine the frame class, rate, and classification feature parameters for the destination codec. The classifier input parameter preparation module separates the bitstream code and unquantizes the sub-codes into the codec parameters. The frame classification and rate decision module comprises M sub-classifiers and a final decision module. The characteristics of the sub-classifiers are obtained by a classifier construction module, which comprises a training set generation module, a learning module and an evaluation module.

35 Claims, 15 Drawing Sheets

METHOD AND APPARATUS FOR FRAME CLASSIFICATION AND RATE DETERMINATION IN VOICE TRANSCODERS FOR TELECOMMUNICATIONS

BACKGROUND OF THE INVENTION

The present invention relates generally to processing of telecommunication signals. More particularly, the invention provides a method and apparatus for classifying speech signals and determining a desired (e.g., efficient) transmission rate to code the speech signal with one encoding method when provided with the parameters of another encoding method. Merely by way of example, the invention has been applied to voice transcoding, but it would be recognized that the invention may also be applicable to other applications.

An important feature of speech coding development is to provide high quality output speech at low average data rate. To achieve this, one approach adapts the transmission rate based on the network traffic. This is the approach adopted by the Adaptive Multi-Rate (AMR) codec used for Global System for Mobile (GSM) Communications. In AMR, one of eight data rates is selected by the network, and can be changed on a frame basis. Another approach is to employ a variable bit-rate scheme Such variable bit rate scheme uses a transmission rate determined from the characteristics of the input speech signal. For example, when the signal is highly voiced, a high bit rate may be chosen, and if the signal has mostly silence or background noise, a low bit rate is chosen. This scheme often provides efficient allocation of the available bandwidth, without sacrificing output voice quality. Such variable-rate coders include the TIA IS-127 Enhanced Variable Rate Codec (EVRC), and $3^{rd}$ generation partnership project 2 (3GPP2) Selectable Mode Vocoder (SMV). These coders use Rate Set 1 of the Code Division Multiple Access (CDMA) communication standards IS-95 and cdma2000, which is made of the rates 8.55 kbit/s (Rate 1 or full Rate), 4.0 kbit/s (half-rate), 2.0 kbit/s (quarter-rate) and 0.8 kbit/s (eighth rate). SMV combines both adaptive rate approaches by selecting the bit-rate based on the input speech characteristics as well as operating in one of six network controlled modes, which limits the bit-rate during high traffic. Depending on the mode of operation, different thresholds may be set to determine the rate usage percentages.

To accurately decide the best transmission rate, and obtain high quality output speech at that rate, input speech frames are categorized into various classes. For example, in SMV, these classes include silence, unvoiced, onset, plosive, non-stationary voiced and stationary voiced speech. It is generally known that certain coding techniques are often better suited for certain classes of sounds. Also, certain types of sounds, for example, voice onsets or unvoiced-to-voiced transition regions, have higher perceptual significance and thus should require higher coding accuracy than other classes of sounds, such as unvoiced speech. Thus, the speech frame classification may be used, not only to decide the most efficient transmission rate, but also the best-suited coding algorithm.

Accurate classification of input speech frames is typically required to fully exploit the signal redundancies and perceptual importance. Typical frame classification techniques include voice activity detection, measuring the amount of noise in the signal, measuring the level of voicing, detecting speech onsets, and measuring the energy in a number of frequency bands. These measures would require the calculation of numerous parameters, such as maximum correlation values, line spectral frequencies, and frequency transformations.

While coders such as SMV achieve much better quality at lower average data rate than existing speech codecs at similar bit rates, the frame classification and rate determination algorithms are generally complex. However, in the case of a tandem connection of two speech vocoders, many of the measurements desired to perform frame classification have already been calculated in the source codec. This can be capitalized on in a transcoding framework. In transcoding from the bitstream format of one Code Excited Linear Prediction (CELP) codec to the bitstream format of another CELP codec, rather than fully decoding to PCM and re-encoding the speech signal, smart interpolation methods may be applied directly in the CELP parameter space. Here, the term "smart" is those commonly understood by one of ordinary skill in the art. Hence the parameters, such as pitch lag, pitch gain, fixed codebook gain, line spectral frequencies and the source codec bit rate are available to the destination codec. This allows frame classification and rate determination of the destination voice codec to be performed in a fast manner. Depending upon the application, many limitations can exist in one or more of the techniques described above.

Although there has been much improvement in techniques for voice transcoding, it would be desirable to have improved ways of processing telecommunication signals.

BRIEF SUMMARY OF THE INVENTION

According to the present invention, techniques for processing of telecommunication signals are provided. More particularly, the invention provides a method and apparatus for classifying speech signals and determining a desired (e.g., efficient) transmission rate to code the speech signal with one encoding method when provided with the parameters of another encoding method. Merely by way of example, the invention has been applied to voice transcoding, but it would be recognized that the invention may also be applicable to other applications.

In a specific embodiment, the present invention provides a method and apparatus for frame classification and rate determination in voice transcoders. The apparatus includes a source bitstream unpacker that unpacks the bitstream from the source codec to provide the codec parameters, a parameter buffer that stores input and output parameters of previous frames and a frame classification and rate decision module (e.g., smart module) that uses the source codec parameters from the current frame and from previous frames to determine the frame class, rate and classification feature parameters for the destination codec. The source bitstream unpacker separates the bitstream code and unquantizes the sub-codes into the codec parameters. These codec parameters may include line spectral frequencies, pitch lag, pitch gains, fixed codebook gains, fixed codebook vectors, rate and frame energy, among other parameters. A subset of these parameters is selected by a parameter selector as inputs to the following frame classification and rate decision module. The frame classification and rate decision module comprises M sub-classifiers, buffers storing previous input and output parameters and a final decision module. The coefficients of the frame classification and rate decision module are pre-computed and pre-installed before operation of the system. The coefficients are obtained from previous training by a classifier construction module, which comprises a training set generation module, a learning module and an evaluation module. The final decision module takes the outputs of each sub-classifier, previous states, and external commands and determines the final frame class output, rate decision output and classification feature parameters output results. The classification feature parameters are used in some destination codecs for later encoding and processing of the speech.

According to an alternative specific embodiment, the method includes deriving the speech parameters from the bitstream of the source codec, and determining the frame class, rate decision and classification feature parameters for the destination codec. This is done by providing the source codec's intermediate parameters and bit rate as inputs for the previously trained and constructed frame and rate classifier. The method also includes preparing training and testing data, training procedures and generating coefficients of the frame classification and rate decision module and pre-installing the trained coefficients into the system.

In yet an alternative specific embodiment, the invention provides a method for a classifier process derived using a training process. The training process comprises processing the input speech with the source codec to derive one or more source intermediate parameters from the source codec, processing the input speech with the destination codec to derive one or more destination intermediate parameters from the destination codec, and processing the source coded speech that has been processed through source codec with the destination codec. The method also includes deriving a bit rate and a frame classification selection from the destination codec and correlating the source intermediate parameters from the source codec and the destination intermediate parameters from the destination codec. A step of processing the correlated source intermediate parameters and the destination intermediate parameters using a training process to build the classifier process is also included. The present method can use suitable commercial software or custom software for the classifier process. As merely an example, such software can include, but is not limited to Cubist, Rule Based Classification, by Rulequest or alternatively custom software such as MuME Multi Modal Neural Computing Environment by Marwan Jabri.

In alternative embodiments, the invention also provides a method for deriving each of the N subclassifiers using an iterative training process. The method includes inputting to the classifier a training set of selected input speech parameters (e.g., pitch lag, line spectral frequencies, pitch gain, code gain, maximum pitch gain for the last 3 subframes, pitch lag of the previous frame, bit rate, bit rate of the previous frame, difference between the bit rate of the current and previous frame) and inputting to the classifier a training set of desired output parameters (e.g., frame class, bit rate, onset flag, noise-to-signal ratio, voice activity level, level of periodicity in the signal). The method also includes processing the selected input speech parameters to determine a predicated frame class and a rate and setting one or more classification model boundaries. The method also includes selecting a misclassification cost function and processing an error based upon the misclassification cost function (e.g., maximum number of iterations in the training process, Least Mean Squared (LMS) error calculation, which is the sum of the squared difference between the desired output and the actual output, weighted error measure, where classification errors are given a cost based on the extent of the error, rather than treating all errors as equal, e.g., classifying a frame with a desired rate of rate 1 (171 bits) as a rate ⅛ (16 bits) frame can be given a higher cost than classifying it as a rate ½ (80 bits) frame) between a predicted frame class and rate and a desired frame class and rate. The method also repeating setting one or more classifier model boundaries (e.g., weights in a neural network classifier, neuron structure (number of hidden layers, number of neurons in each layer, connections between the neurons) of a neural network classifier), learning rate of a neural network classifier, which indicates the relative size in the change in weights for each iteration, network algortihm (e.g. back propagation, conjugate gradient descent) of a neural network classifier. logical relationships in a decision tree classifier, decision boundary criteria (parameters used to define boundaries between classes and boundary values) for each class in a decision tree classifier, branch structure (max number of branches, max number of splits per branch, minimum cases covered by a branch) of a decision tree classifier) based upon the error and desired output parameters.

A number of different classifier models and options are presented, however the scope of this invention covers any classification techniques and learning methods.

Numerous benefits are achieved using the present invention over conventional techniques. For example, the present invention is to apply a smart frame and rate classifier in the transcoder between two voice codecs according to a specific embodiment. The invention can also be used to reduce the computational complexity of the frame classification and rate determination of the destination voice codec by exploiting the relationship between the parameters available from the source codec, and the parameters often required to perform frame classification and rate determination according to other embodiments. Depending upon the embodiment, one or more of these benefits may be achieved. These and other benefits are described throughout the present specification and more particularly below.

Other features and advantages of the present invention will be apparent from the following description taken in conjunction with the accompanying drawing, in which like reference characters designate the same or similar parts throughout the figures thereof.

BRIEF DESCRIPTION OF THE DRAWINGS

Certain objects, features, and advantages of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

According to the present invention, techniques for processing of telecommunication signals are provided. More particularly, the invention provides a method and apparatus for classifying speech signals and determining a desired (e.g., efficient) transmission rate to code the speech signal with one encoding method when provided with the parameters of another encoding method. Merely by way of example, the invention has been applied to voice transcoding, but it would be recognized that the invention may also be applicable to other applications.

Figure 1:
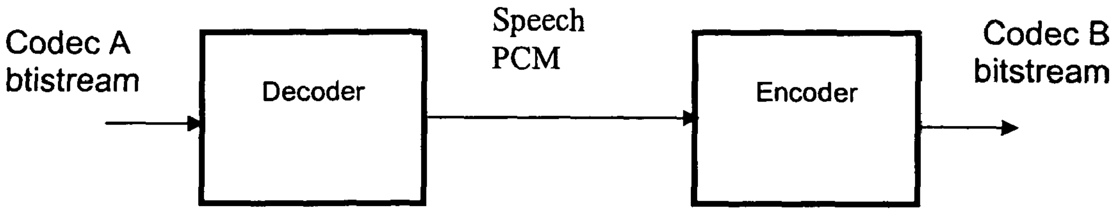
FIG. 1 is a simplified block diagram illustrating a tandem coding connection to convert a bitstream from one codec format to another codec format according to an embodiment of the present invention.
Figure 2:
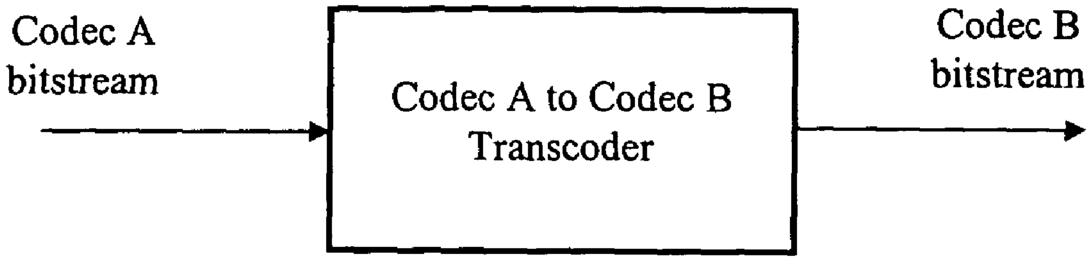
FIG. 2 is a simplified block diagram illustrating a transcoder connection to convert a bitstream from one codec format to another codec format without full decode and re-encode according to an alternative embodiment of the present invention.
Figure 3:
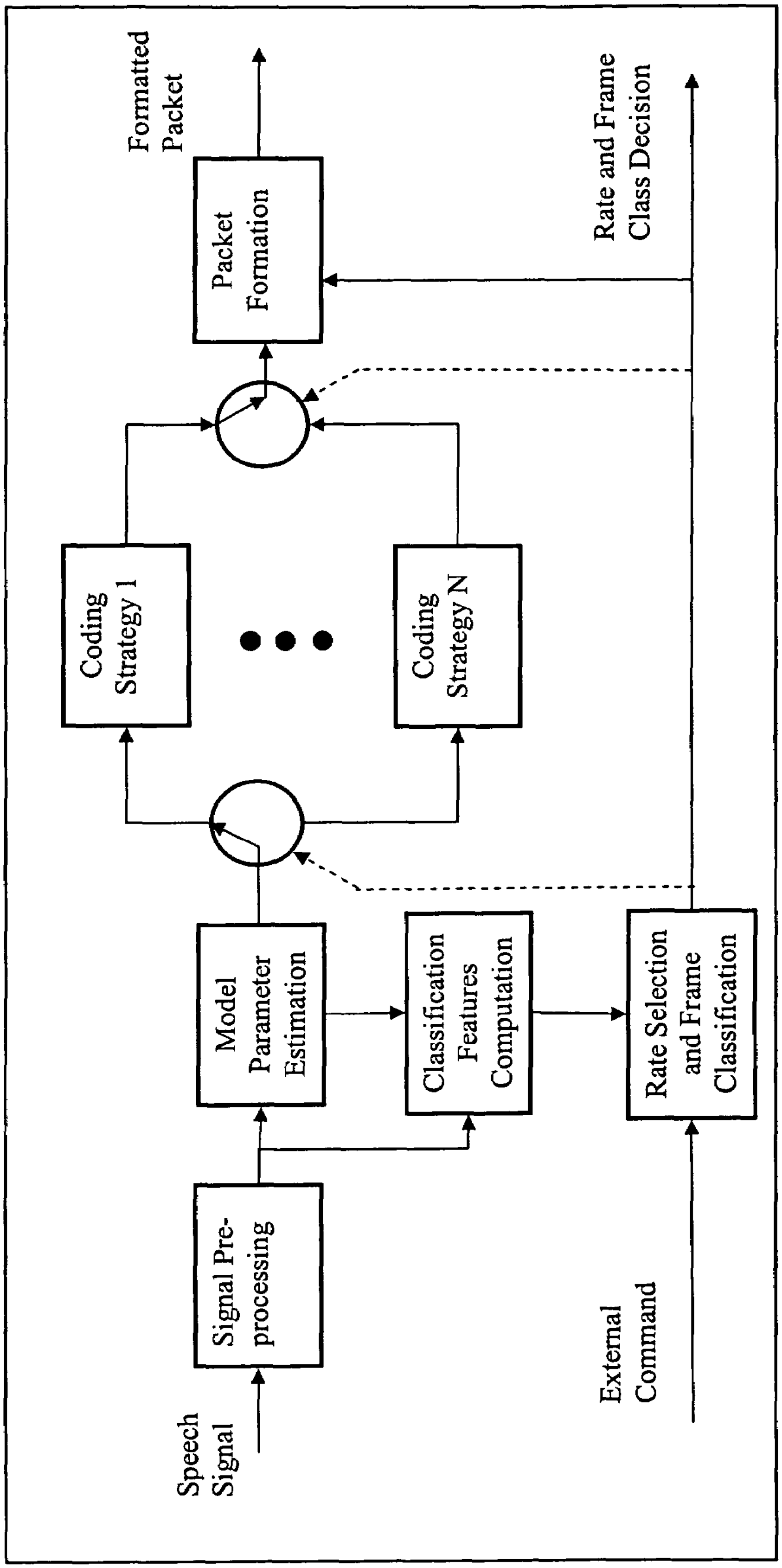
FIG. 3 is a simplified block diagram illustrating encoding processes performed in a variable-rate speech encoder according to an embodiment of the present invention.

A block diagram of a tandem connection between two voice codecs is shown in FIG. 1. This diagram is merely an example and should not unduly limit the scope of the claims herein. One of ordinary skill in the art would recognize many variations, modifications, and alternatives. Alternatively a transcoder may be used, as shown in FIG. 2, which converts the bitstream from a source codec to the bitstream of a destination codec without fully decoding the signal to PCM and then re-encoding the signal. This diagram is merely an example and should not unduly limit the scope of the claims herein. One of ordinary skill in the art would recognize many variations, modifications, and alternatives. In a preferred embodiment, the frame classification and rate determination apparatus of the present invention is applied within a transcoder between two CELP-based codecs. More specifically, the destination voice codec is a variable bit-rate codec in which the input speech characteristics contribute to the selection of the bit-rate. A block diagram of the encoder of a variable bit-rate voice coder is shown in FIG. 3. This diagram is merely an example and should not unduly limit the scope of the claims herein. One of ordinary skill in the art would recognize many variations, modifications, and alternatives. As an example for illustration, we have indicated that the source codec is the Enhanced Variable Rate Codec (EVRC) and the destination codec is the Selectable Mode Vocoder (SMV), although others can be used. The procedures performed in the classification module of SMV are shown in FIG. 4.

Figure 4:
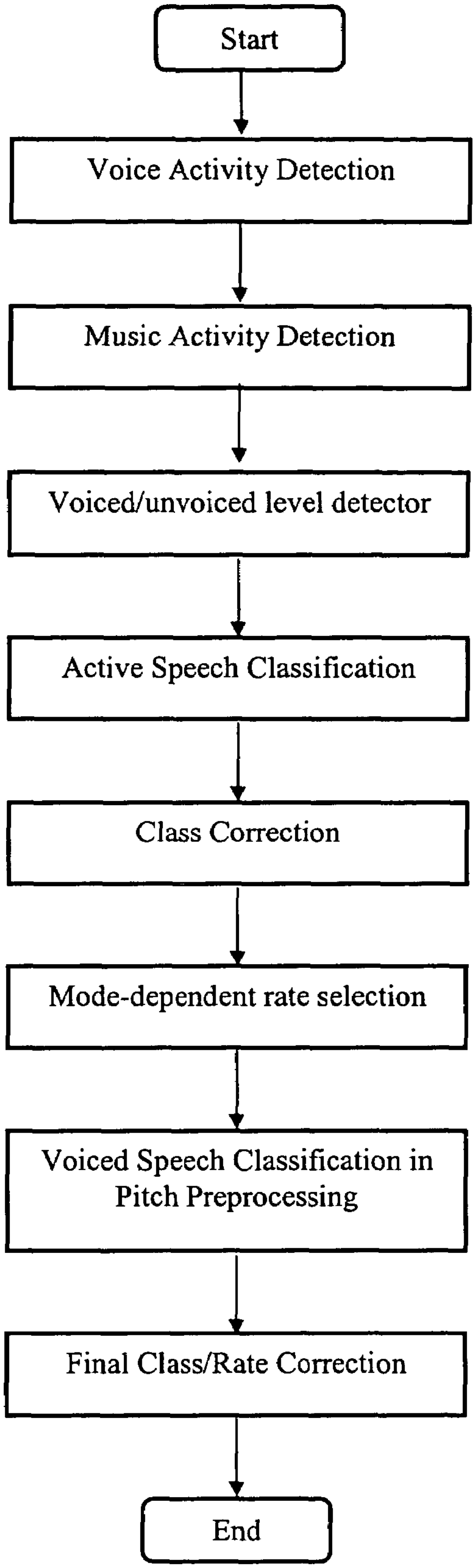
FIG. 4 illustrates the various stages of frame classification in an SMV encoder according to an embodiment of the present invention.

FIG. 4 illustrates the various stages of frame classification in an SMV encoder according to an embodiment of the present invention. This diagram is merely an example and should not unduly limit the scope of the claims herein. One of ordinary skill in the art would recognize many variations, modifications, and alternatives. As shown, the method begins with start. The method includes, among other processes, voice activity detection music detection, voiced/unvoiced level detection, active speech classification, class correction, mode-dependent rate selection, voiced speech classification in patch preprocessing, final class/rate correction, and other steps. Further details of each of these processes can be found through out the present specification and more particularly below.

Figure 5:
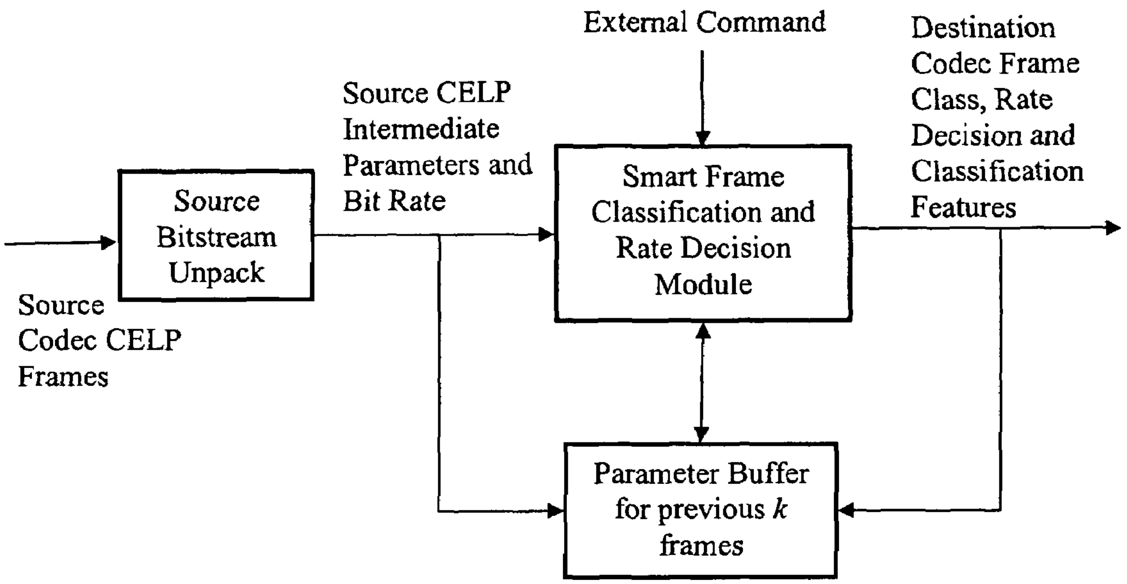
FIG. 5 is a simplified block diagram of the frame classification and rate determination method according to an embodiment of the present invention.

FIG. 5 is a block diagram illustrating the principles of the frame classification and rate decision apparatus according to the present invention. This diagram is merely an example and should not unduly limit the scope of the claims herein. One of ordinary skill in the art would recognize many variations, modifications, and alternatives. The apparatus receives the source codec bitstream as an input to the classifier input parameter preparation module, and passes the resulting selected CELP intermediate parameters and bit rate, an external command, and source codec CELP parameters and bit rates from previous frames to the frame classification and rate decision module. In this embodiment, the external command applied to the frame classification and rate decision module is the network controlled operation mode for the destination voice codec. The frame classification and rate decision module produces, as output, a frame class and rate decision for the destination codec. Depending on the destination voice codec and the network controlled operation mode for the destination voice codec, other classification features may also be determined within the frame classification and rate decision module. Such features include measures of the noise-to-signal ratio, voiced/unvoiced level of the signal, and the ratio of peak energy to average energy in the frame. These features often provide information not only for the rate and frame classification task, but also for later encoding and processing.

Figure 6:
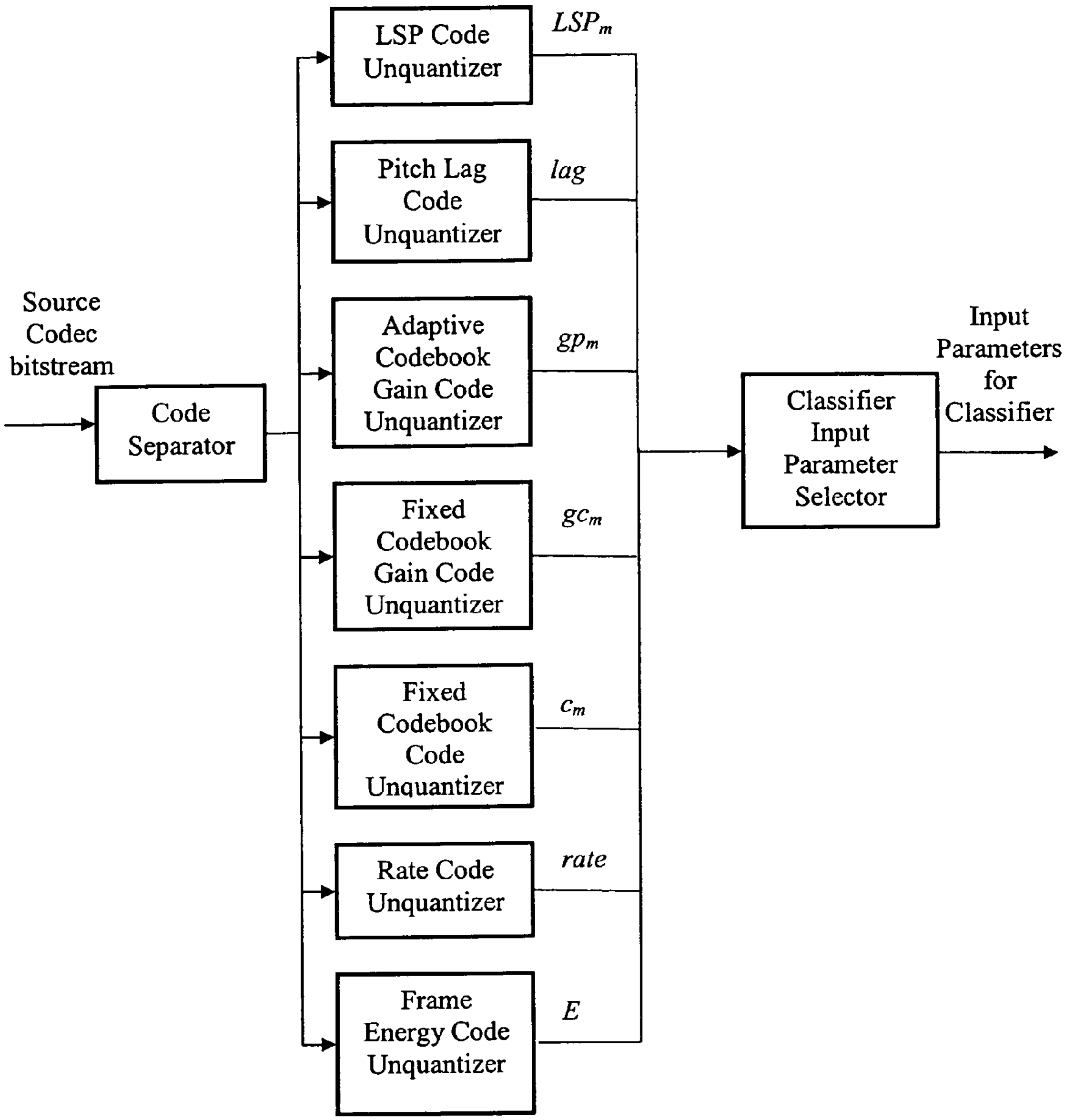
FIG. 6 is a simplified block diagram of the classifier input parameter preparation module according to an embodiment of the present invention.

FIG. 6 is a block diagram of the classifier input parameter preparation module, which comprises a source bitstream unpacker, parameter unquantizers and an input parameter selector. This diagram is merely an example, which should not unduly limit the scope of the claims herein. One of ordinary skill in the art would recognize many variations, alternatives, and modifications. The source bitstream unpacker separates the bitstream code for each frame into a LSP code, a pitch lag code, and adaptive codebook gain code, a fixed codebook gain code, a fixed codebook vector code, a rate code and a frame energy code, based on the encoding method of the source codec. The actual parameter codes available depends on the codec itself, the bit-rate, and if applicable, the frame type. These codes are input into the code unquantizers which output the LSPs, pitch lag(s), adaptive codebook gains, fixed codebook gains, fixed codebook vectors, rate, and frame energy respectively. Often more than one value is available at the output of each code unquantizer due to the multiple subframe excitation processing used in many CELP coders. The CELP parameters for the frame are then input to the classifier input parameter selector. The parameter input selector chooses which parameters are to be used in the classification task.

The procedures for creating classifiers may vary and the following specific embodiments presented are examples for illustration. Other classifiers (and associated procedures) may also be used without deviating from the scope of the invention.

Figure 7:
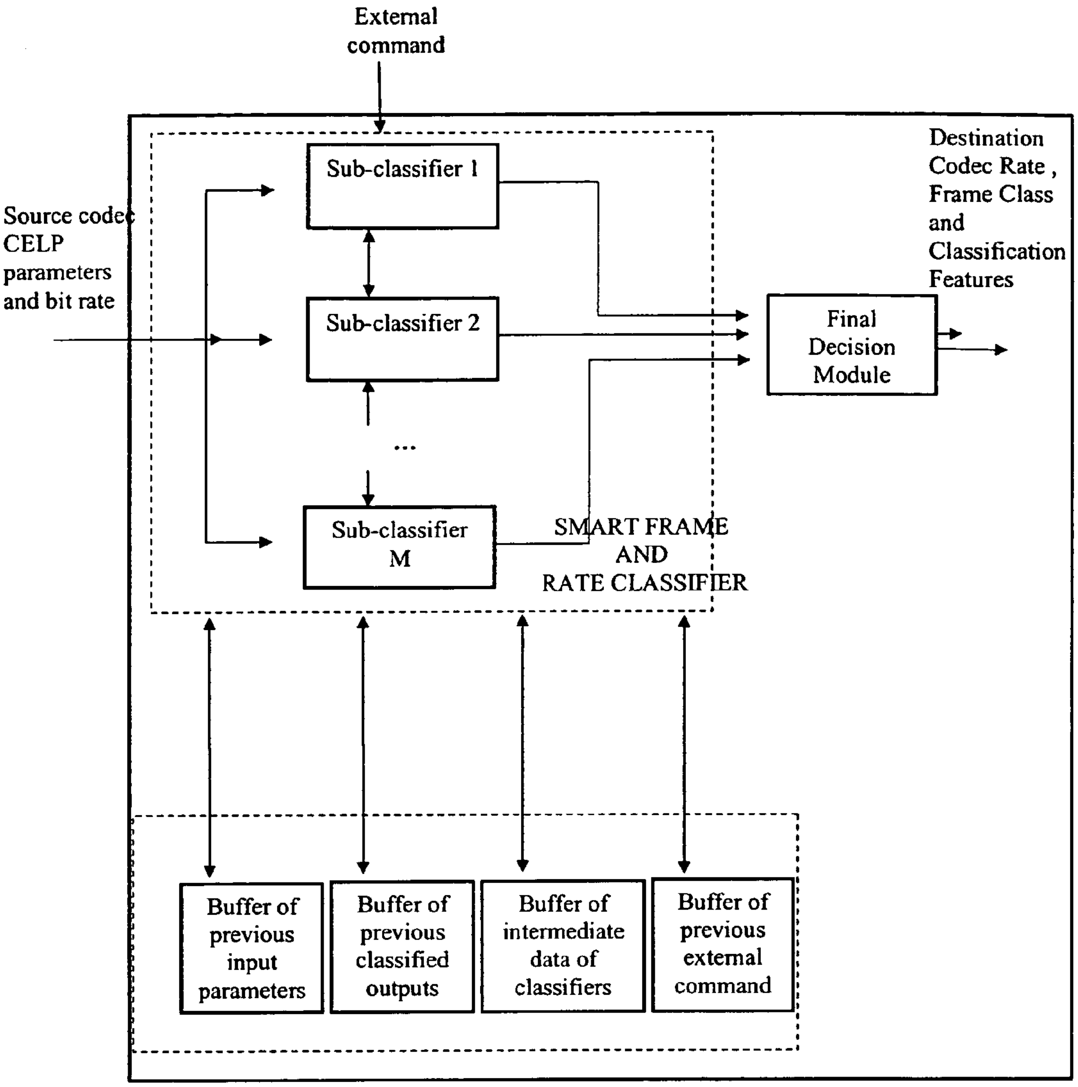
FIG. 7 is a simplified diagram of a multi-subclassifier structure of the frame classification and rate determination classifier with parameter buffers according to an embodiment of the present invention.

FIG. 7 is a block diagram of the frame classification and rate decision module which comprises M sub-classifiers, a final decision module, and buffers storing previous input parameters and previous classified outputs. This diagram is merely an example, which should not unduly limit the scope of the claims herein. One of ordinary skill in the art would recognize many variations, alternatives, and modifications. The M sub-classifiers are a set of classifiers that perform a series of feature classification tasks separately. In this example, M=2, where classifier 1 is the rate classifier, and classifier 2 is the frame class classifier. The final decision module selects the rate and frame class to be used in the destination voice codec, based on the outputs of the sub-classifiers, and allowable rate and frame class combinations and transitions defined by and suitable for the destination voice coding. In certain embodiments, several minor parameters are also output by the classification module, requiring M>2. These additional feature parameters aid the frame class and rate decision, as well as provide information for later computations, such as determining the selection criteria for the fixed codebook search.

Figure 8:
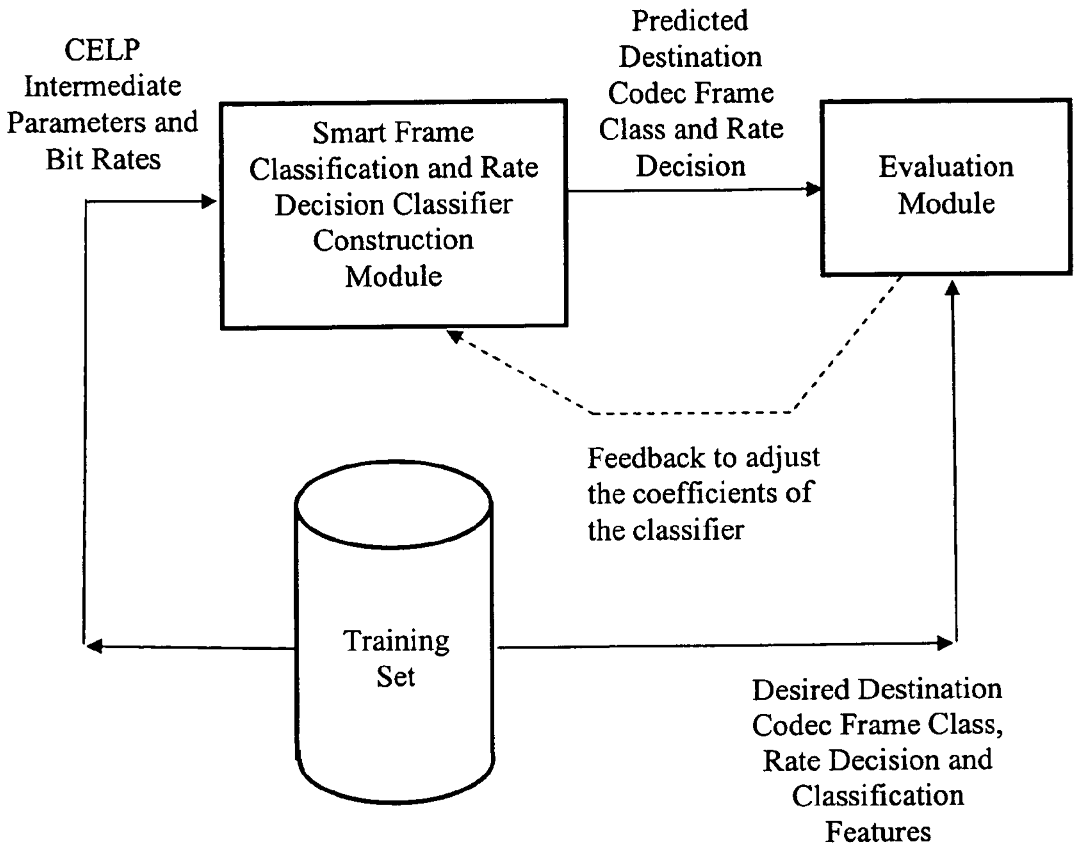
FIG. 8 is a simplified block diagram illustrating the training procedure for the frame classification and rate determination classifier according to an embodiment of the present invention.
Figure 9:
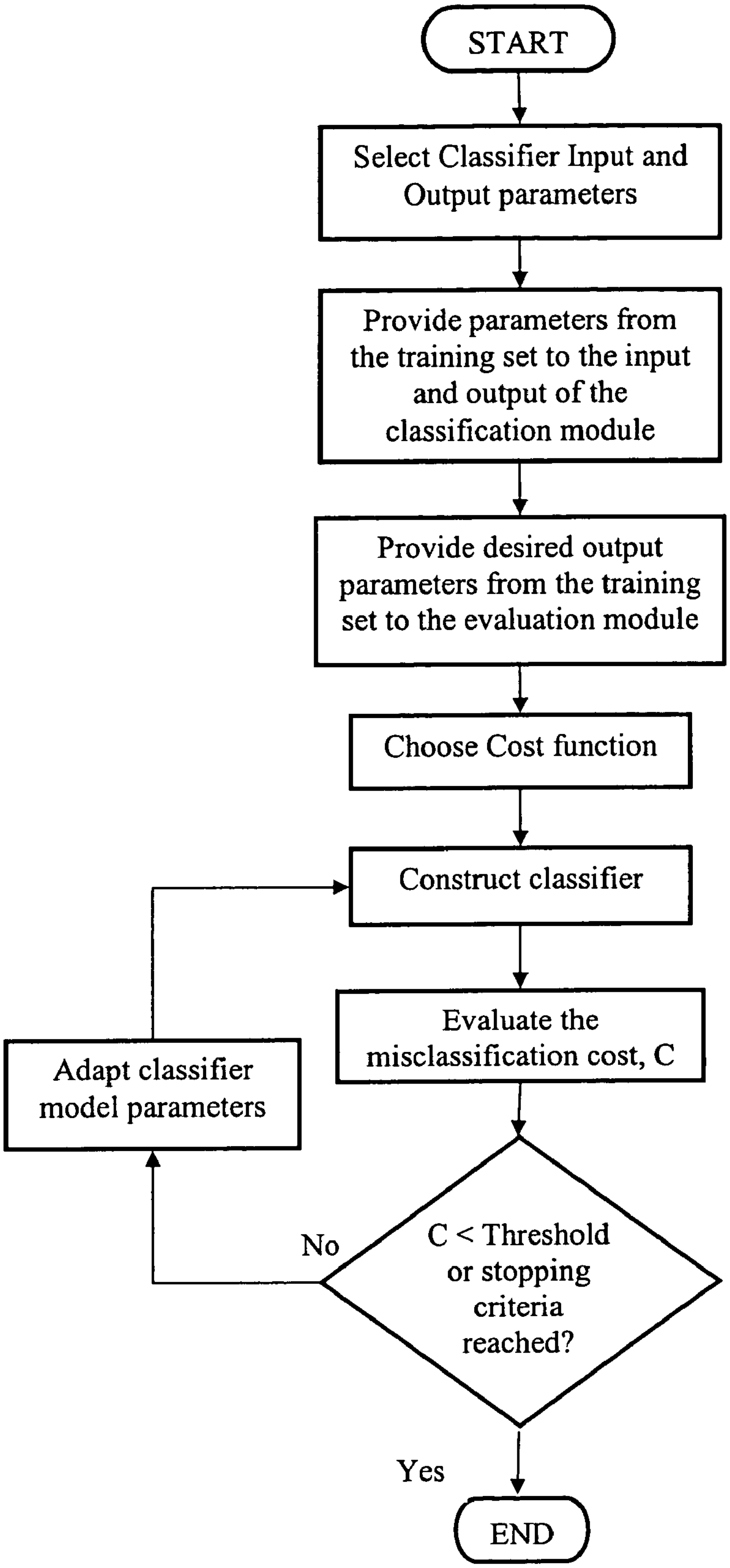
FIG. 9 is a simplified flow chart describing the training procedure for the proposed frame classification and rate determination classifier according to an embodiment of the present invention.

The coefficients of each classifier are pre-installed and are obtained previously by a classification construction module, which comprises a training set, a generation module, a learning module and an evaluation module shown in FIG. 8. This diagram is merely an example, which should not unduly limit the scope of the claims herein. One of ordinary skill in the art would recognize many variations, alternatives, and modifications. The procedure for training the classifier is shown in FIG. 9. This diagram is merely an example, which should not unduly limit the scope of the claims herein. One of ordinary skill in the art would recognize many variations, alternatives, and modifications. The inputs of the training set are provided to the rate decision classifier construction module and the desired outputs are provided to the evaluation module. A number of training algorithms may be selected based on the classifier architectures and training set features. The coefficients of the classifiers are adjusted and the error is calculated at each iteration during the training phase. The predicted destination codec rate decision is passed to the evaluation module which compares the predicted outputs to the desired outputs. A cost function is evaluated to measure the extent of any misclassifications. If the cost or error is less than the minimum error threshold, the maximum number of iterations has been reached, or the convergence criteria are met, the training stops. The training procedure may be repeated with different initial parameters to explore potential improvements on the classification performance.

The resulting coefficients of the classifier are then pre-installed within the frame class and rate determination classifier.

Several embodiments for frame classifiers and rate classifiers are provided in the next section for illustration. Similar methods may be applied for training and construction of the frame class classifier. It is noted, that each classifier may use a different classification method, related features could be derived using additional classifiers and that both rate and frame class may be determined using a single classifier structure. Further details of certain methods according to embodiments of the present invention may be described in more detail throughout the present specification and more particularly below.

In order to show the embodiments of the present invention, an example of transcoding from a source codec EVRC bitstream to a destination codec SMV bitstream is shown.

Figure 12:
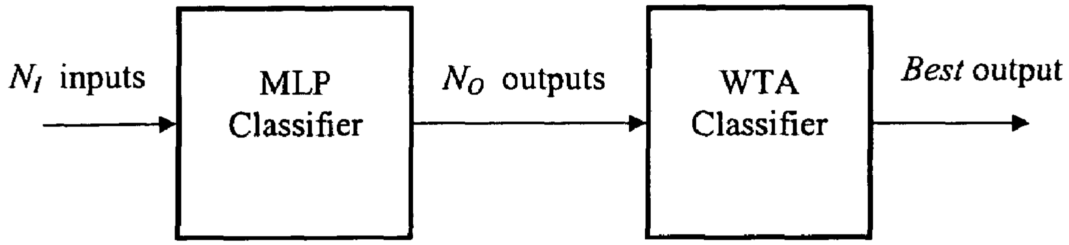
FIG. 12 is a simplified block diagram illustrating a cascade multi-classifier approach, using a combination of a Artificial Neural Network Multi-Layer Perceptron Classifier and a Winner-Takes-All Classifier.
Figure 13:
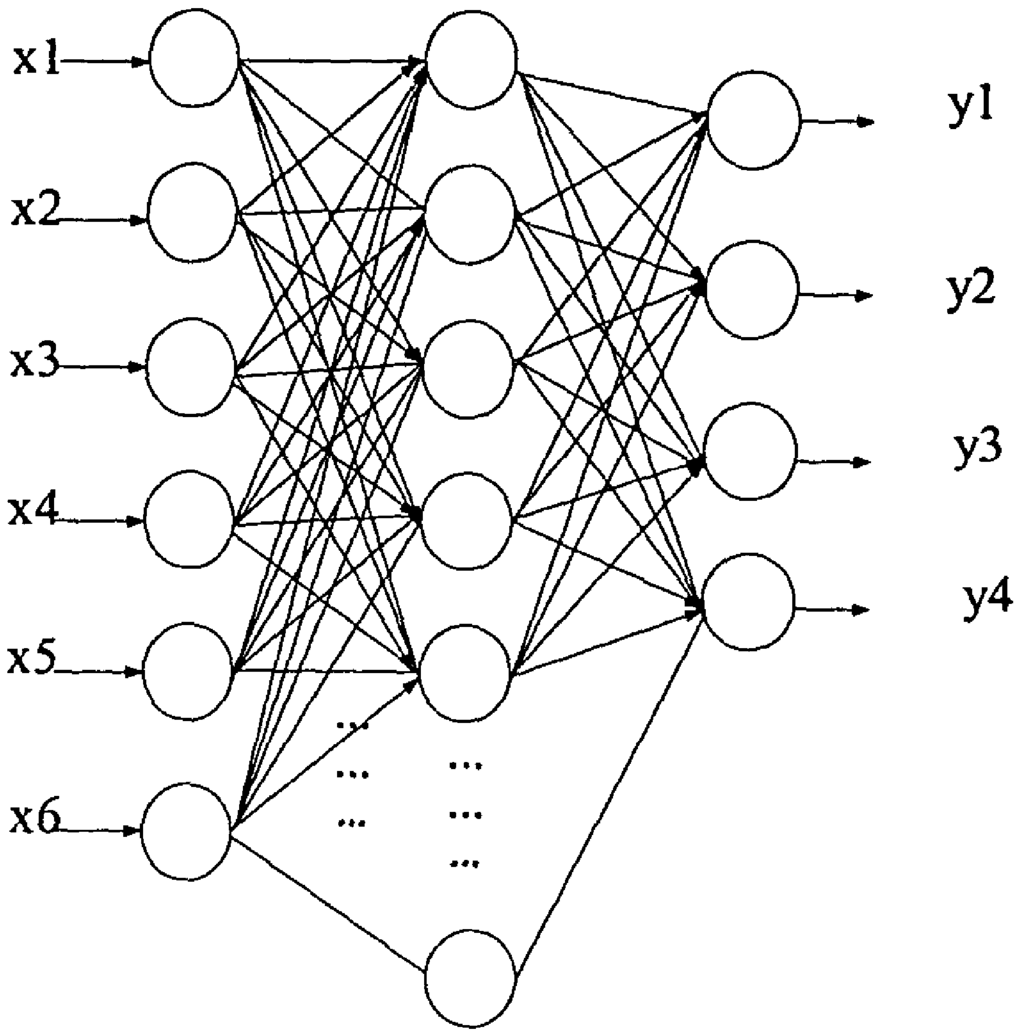
FIG. 13 is a simplified diagram illustrating a possible neuron structure for the Artificial Neural Network Multi-Layer Perceptron Classifier of FIG. 12 according to an embodiment of the present invention.

According to the first embodiment, the Classifier 1 shown in FIG. 7 is formed by an artificial neural network of the form of FIG. 12. This diagram is merely an example, which should not unduly limit the scope of the claims herein. One of ordinary skill in the art would recognize many variations, alternatives, and modifications. The combined neural network consists of a Multi-layer Perceptron classifier cascaded with a Winner-Takes-All classifier. The Multi-layer Perceptron classifier, an example of which is shown in FIG. 13, takes $N_I$ inputs and produces $N_O$ outputs. For the case of determining the SMV rate, $N_O$=4, where each output corresponds to each of the 4 transmission rates. The Winner-Takes-all Classifier is a 4-1 classifier that selects the highest output. As an example, $N_I$=9, and the MLP is a 3-layer neural network with 18 neurons in the hidden layer.

Figure 10:
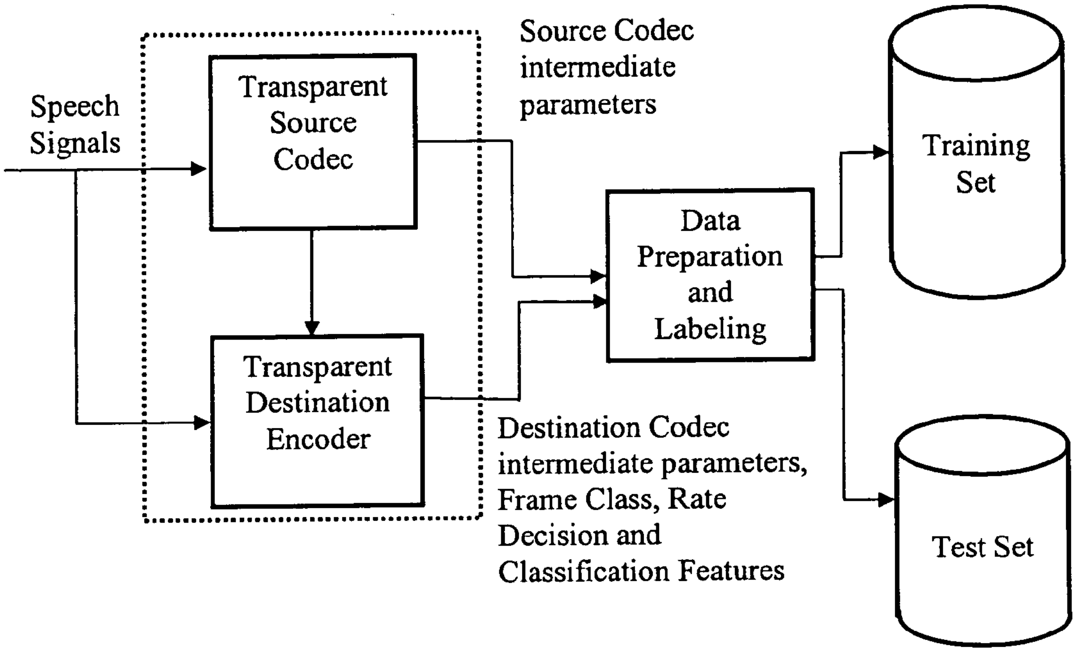
FIG. 10 is a simplified block diagram illustrating the preparation of the training data set for the frame classification and rate determination classifier according to an embodiment of the present invention.
Figure 11:
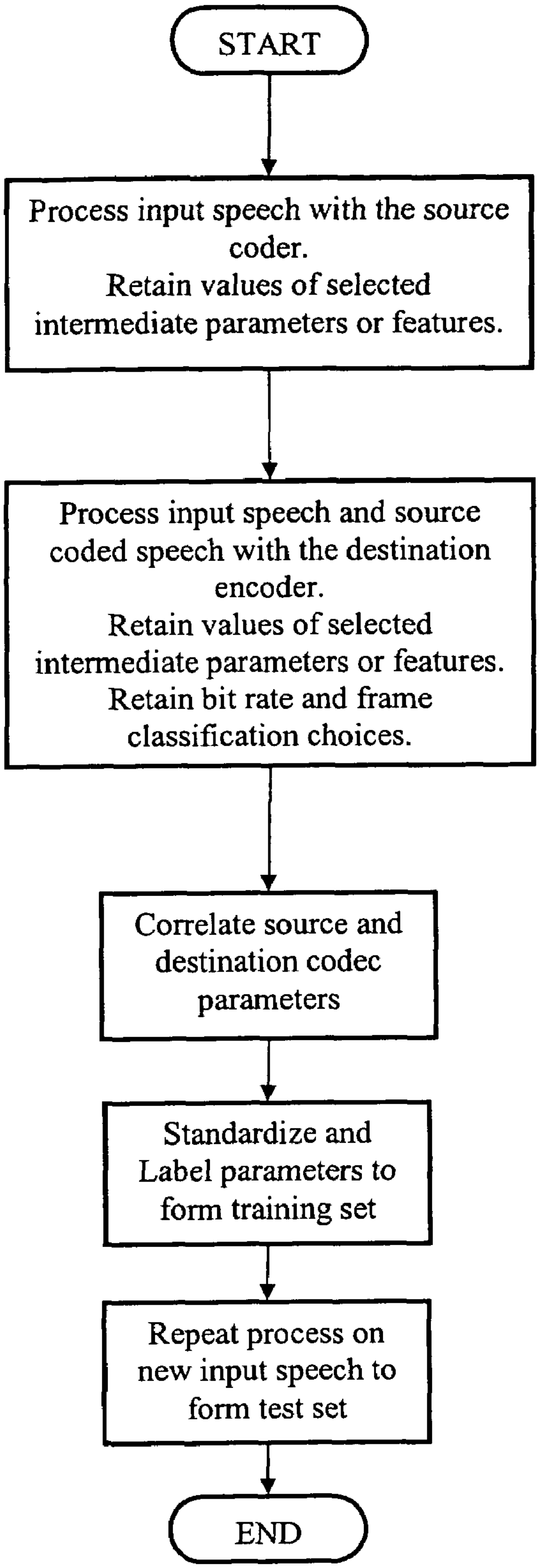
FIG. 11 is a simplified flow chart describing the preparation of the training data set for the frame classification and rate determination classifier according to an embodiment of the present invention.

FIG. 10 is a block diagram illustrating the preparation of the training set and test set, and the procedure is outlined in FIG. 11. These diagrams are merely an example, which should not unduly limit the scope of the claims herein. One of ordinary skill in the art would recognize many variations, alternatives, and modifications. The digitized input speech signals are coded first by the source codec EVRC. The source codec, EVRC, is transparent, in that a large number of parameters may be retained, not just those provided in the codec bitstream. The input speech signals, or the source codec coded speech, or both input speech signals and source codec coded speech are then coded by the destination coder, SMV. The rate determined by SMV is retained, as well as any other additional parameters or features. Source parameters and destination parameters are then correlated and any delays are taken into account. The data is then prepared by standardizing each input to have zero mean and unity variance and the desired outputs are labeled. The additional parameters saved may be used as supplementary outputs to provide hints and help the network identify features during training. The resulting standardized and labeled data are used as the training set. The procedure is repeated using different input digitized speech signals to produce a test data set for evaluating the classifier performance.

The procedure for training the neural network classifier is shown in FIG. 8 and FIG. 9. These diagrams are merely examples, which should not unduly limit the scope of the claims herein. One of ordinary skill in the art would recognize many variations, alternatives, and modifications. The inputs of the training set are provided to the rate decision classifier construction module and the desired outputs are provided to the evaluation module. A number of training algorithms may be used, such as back propagation or conjugate gradient descent. A number of non-linear functions can be applied to the neural network. At each iteration, the coefficients of the classifier are adjusted and the error is calculated. The predicted destination codec rate decision is passed to the evaluation module which compares the predicted outputs to the desired outputs. A cost function is evaluated to measure the extent of any misclassifications. If the cost or error is less than the minimum error threshold, the maximum number of iterations has been reached, or the convergence criteria are met, the training stops.

The resulting classifier coefficients are then pre-installed within the frame class and rate determination classifier. Other embodiments of the present invention may be found throughout the present specification and more particularly below.

Figure 14:
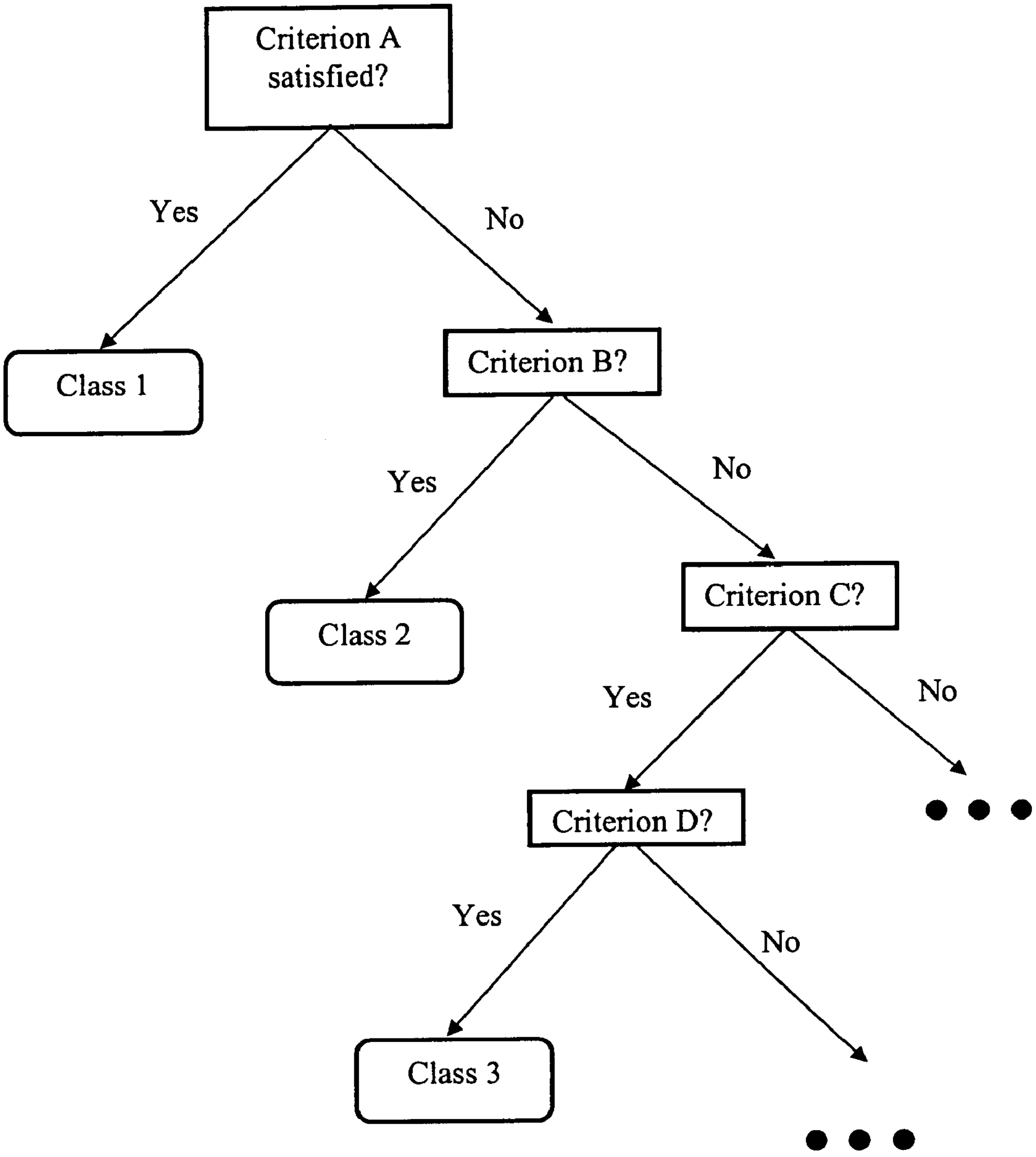
FIG. 14 is a simplified diagram illustrating a decision-tree based classifier according to an embodiment of the present invention.
Figure 15:
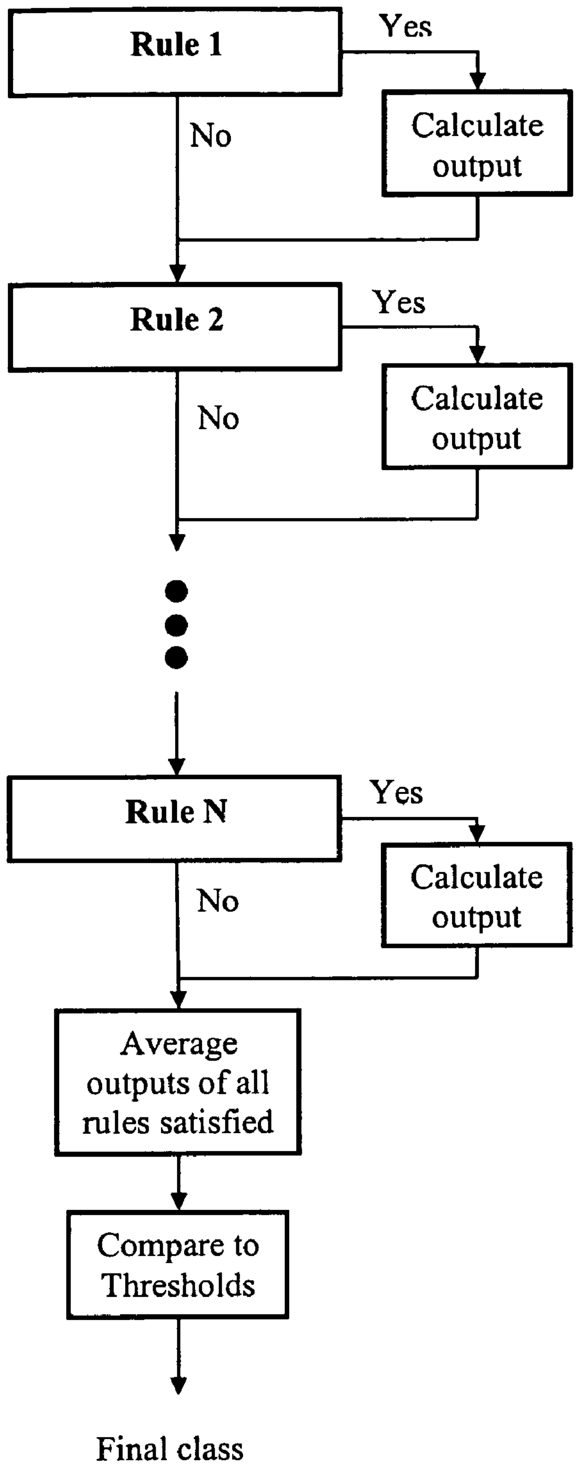
FIG. 15 is a simplified diagram illustrating a rule-based model classifier according to an embodiment of the present invention.

According to a specific embodiment, which may be similar to the previous embodiment except at least that the classification method used is a Decision Tree, a method has been illustrated. Decision Trees are a collection of ordered logical expressions, which lead to a final category. An example of a decision tree classifier structure is illustrated in FIG. 14. This diagram is merely an example, which should not unduly limit the scope of the claims herein. One of ordinary skill in the art would recognize many variations, alternatives, and modifications. At the top is the root node, which is connected by branches to other nodes. At each node, a decision is made. This pattern continues until a terminal or leaf node is reached. The leaf node provides the output category or class. The decision tree process can be viewed as a series of if-then-else statements, such as,

```
if (Criterion A)
    then        Output = Class 1
else if (Criterion B)
    then        Output = Class 2
else if (Criterion C)
    if (Criterion D)
                then Output = Class 3
    else
    . . .
```

Each criterion may take the form

Parameter k{<, >, ==, !=, is an element of} {numerical value, attribute}

For example,

Pitch gain<0.5

Previous frame is {voiced or onset}

For the rate determination classifier for SMV, the output classes are labeled Rate 1, Rate ½, Rate ¼ and Rate ⅛. Only one path through the decision tree is possible for each set of input parameters.

The size of the tree may be limited to suit implementation purposes.

The criteria of the decision tree can be obtained through similar training procedure as the embodiments shown in FIG. 10 and FIG. 11. These diagrams are merely examples, which should not unduly limit the scope of the claims herein. One of ordinary skill in the art would recognize many variations, alternatives, and modifications.

An alternative embodiment will also be illustrated. Preferably, the present embodiment can be similar at least in part to the first and the second embodiment except at least that the classification method used is a Rule-based Model classifier. Rule-based Model classifiers comprise of a collection of unordered logical expressions, which lead to a final category or a continuous output value. The structure of a Rule-based Model classifier is illustrated in FIG. 14. This diagram is merely an example, which should not unduly limit the scope of the claims herein. One of ordinary skill in the art would recognize many variations, alternatives, and modifications. The model may be constructed so that the output class may be one of a fixed set, for example, {Rate 1, Rate ½, Rate ¼ and Rate ⅛}, or the output may be presented as a continuous variable derived by the linear combination of selected input values. Typically, rules overlap so an input set of parameters may satisfy more than one rule. In this case, the average of the outputs for all rules that are satisfied is used. A linear rule-based model classifier can be viewed as a set of if-then rules, such as, Rule 1:

if (Criterion A and Criterion B and . . . )

then Output=$x_0$+$x_1$*Parameter1+$x_2$*Parameter2+ . . . +$x_K$*ParameterK

Rule 2:

if (Criterion C and Criterion D and . . . )

then Output=$y_0$+$y_1$*Parameter1+$y_2$*Parameter2+ . . . $y_K$*ParameterK

Each criterion may take the form

Parameter k{<, >, ==, !=, is an element of} {numerical value, attribute}

The continuous output variable may be compared to a set of predefined or adaptive thresholds to produce the final rate classification. For example,

```
if (Output < Threshold 1)
    Output rate = Rate 1
else if (Output < Threshold 2)
    Output rate = Rate ½
. . .
```

The number of rules included may be limited to suit implementation purposes.

OTHER CELP TRANSCODERS

The invention of frame classification and rate determination described in this document is generic to all CELP based voice codecs, and applies to any voice transcoders between the existing codecs G.723.1, GSM-AMR, EVRC, G.728, G.729, G.729A, QCELP, MPEG-4 CELP, SMV, AMR-WB, VMR and any voice codecs that make use of frame classification and rate determination information.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein. For example, the functionality above may be combined or further separated, depending upon the embodiment. Certain features may also be added or removed. Additionally, the particular order of the features recited is not specifically required in certain embodiments, although may be important in others. The sequence of processes can be carried out in computer code and/or hardware depending upon the embodiment. Of course, one or ordinary skill in the art would recognize many other variations, modifications, and alternatives.

Additionally, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for performing frame classification and rate determination in a transcoding process operating on a source bitstream coded in a source voice codec, the transcoding process being performed without reconstructing a voice signal, the apparatus comprising:

a source bitstream unpacker associated with the source codec, the source bitstream unpacker being operative to generate one or more parameters, wherein the source bitstream unpacker comprises:

a code separator operative to receive the source bitstream coded by the source voice codec and separate one or more indices representing one or more compression parameters associated with the source voice codec, one or more unquantizer modules coupled to the code separator, the one or more unquantizer modules operative to unquantize the one or more indices to provide one or more compression parameters associated the source voice codec, and a classifier input parameter selector coupled to the one or more unquantizer modules, the classifier input parameter selector operative to determine which compression parameters will be used in a classification process;

a buffer coupled to the source bitstream unpacker and operative to store one or more frame classification and rate determination parameters; and a frame classification and rate determination module coupled to the source bitstream unpacker and the buffer, the frame classification and rate determination module being operative to output a frame class and a rate for the destination voice codec through the use of one or more parameters associated with the source bitstream coded in the source voice codec and free from the use of a voice signal.

2. The apparatus of claim 1, wherein the buffer comprises:

an input parameter buffer operative to store one or more of the input parameters associated with one or more previous frames for the frame classification and rate determination module;

an output parameter buffer coupled to the input parameter buffer and operative to store the output parameters associated with one or more previous frames for the frame classification and rate determination module;

an intermediate data buffer coupled to the output parameter buffer and operative to store one or more states associated with one or more current frames; and a command buffer coupled to the intermediate data buffer and operative to store one or more external control signals associated with the one or more previous frames.

3. The apparatus of claim 1 wherein the source voice codec comprises bit stream information, the bit stream information including pitch gains, fixed codebook gains, and/or spectral shape parameters.

4. The apparatus of claim 3 wherein the frame classification and rate determination module operative to output a frame class and a rate for the destination voice codec does not include a stage of speech signal pre-processing in the destination voice codec.

5. An apparatus for performing frame classification and rate determination in a transcoding process operating on a source bitstream coded in a source voice codec, the transcoding process being performed without reconstructing a voice signal, the apparatus comprising:

a source bitstream unpacker associated with the source codec, the source bitstream unpacker being operative to generate one or more parameters, wherein the source bitstream unpacker operates to generate one or more parameters without decoding a voice signal;

a buffer coupled to the source bitstream unpacker and operative to store one or more frame classification and rate determination parameters; and a frame classification and rate determination module coupled to the source bitstream unpacker and the buffer, the frame classification and rate determination module being operative to output a frame class and a rate for the destination voice codec through the use of one or more parameters associated with the source bitstream coded in the source voice codec and free from the use of a voice signal.

6. The apparatus of claim 5 wherein the one or more frame classification and rate determination parameters further comprise of:

one or more input parameters of the frame classification and rate determination module associated with the one or more previous frames;

one or more intermediate parameters of the frame classification and rate determination module;

one or more classified outputs of the frame classification and determination module associated with the one or more previous frames; and one or more external commands associated with the one or more previous frames.

7. The apparatus of claim 5 wherein the source voice codec is EVRC and the destination voice codec is SMV.

8. The apparatus of claim 5 wherein the source voice codec is SMV and the destination voice codec is EVRC.

9. An apparatus for performing frame classification and rate determination in a transcoding process operating on a source bitstream coded in a source voice codec, the transcoding process being performed without reconstructing a voice signal, the apparatus comprising:

a source bitstream unpacker associated with the source codec, the source bitstream unpacker being operative to generate one or more parameters;

a buffer coupled to the source bitstream unpacker and operative to store one or more frame classification and rate determination parameters; and a frame classification and rate determination module coupled to the source bitstream unpacker and the buffer, the frame classification and rate determination module being operative to output a frame class and a rate for the destination voice codec through the use of one or more parameters associated with the source bitstream coded in the source voice codec and free from the use of a voice signal, wherein the frame classification and rate determination module performs frame classification and rate determination without reconstructing a voice signal and wherein the frame classification and rate determination module further comprises:

a classifier comprising one or more feature sub-classifiers, the one or more feature sub-classifiers operative to perform a particular feature classification or a pattern classification without reconstructing a voice signal, wherein the one or more feature sub-classifiers have one or more coefficients provided by a training process, and a decision module coupled to the one or more feature sub-classifiers, the decision module being associated with a source voice codec and a destination voice codec, the decision module operative to produce one or more results associated with a frame class and a rate decision of a destination voice codec based on one or more sets of input data.

10. The apparatus of claim 9 wherein the one or more feature sub-classifiers comprise a plurality of pre-installed coefficients maintained in memory.

11. The apparatus of claim 10 wherein the pre-installed coefficients in the one or more feature sub-classifiers are derived from a classification construction module.

12. The apparatus of claim 11 wherein the classifier construction module comprises:

a training set generation module;

a classifier training module; and a classifier evaluation module.

13. The apparatus of claim 10 wherein the pre-installed coefficients in the one of more feature sub-classifiers are data types from logical relationships, a decision tree, decision rules, weights of artificial neural networks, or numerical coefficient data in analytical formula.

14. The apparatus of claim 9 wherein the one or more feature sub-classifiers are associated with the destination voice codec and one or more external command signals.

15. The apparatus of claim 9 wherein each of the one or more feature sub-classifiers receives an input of selected classification input parameters, past selected classification input parameters, past output parameters, and selected outputs of the other sub-classifiers.

16. The apparatus of claim 9 wherein each of the one or more feature sub-classifiers determines the class or value of a feature which contributes to one or more of the decision outputs of the frame classification and rate determination module and comprises a structure of a different classification process.

17. The apparatus of claim 9 wherein one of the one or more feature sub-classifiers determines the class or value of a feature which contributes to one or more of the decision outputs of the frame classification and rate determination module and comprises an artificial neural network multilayer perceptron classifier.

18. The apparatus of claim 9 wherein one of the feature sub-classifiers determines the class or value of a feature which contributes to one or more of the decision outputs of the frame classification and rate determination module and comprises a decision tree classifier.

19. The apparatus of claim 9 wherein one of the feature sub-classifiers determines the class or value of a feature which contributes to one or more of the decision outputs of the frame classification and rate determination module and comprises a rule-based model classifier.

20. The apparatus of claim 9 wherein the decision module enforces the rate, class and classification feature parameter limitations of the destination codec, so as not to allow illegal rate transitions from frame to frame or so as not to allow a conflicting combination of rate, class, and classification feature parameters within the current frame.

21. The apparatus of claim 9 wherein the decision module favors preferred rate and class combinations based on the source and destination codec combination in order to improve the quality of the synthesized speech, or to reduce computational complexity, or to otherwise gain in performance.

22. The apparatus of claim 9 wherein the one or more sets of input data consist of:

one or more outputs from each of the one or more feature sub-classifiers;

one or more combinations and transitions of allowable rate and frame classes associated with the destination voice codec;

one or more intermediate data associated with one or more previous frames;

one or more parameters associated with a source voice codec; and one or more external control signals.

23. The apparatus of claim 9 wherein the one or more feature sub-classifiers determine one or more pre-encoded speech characteristics from a set of encoded speech parameters.

24. The apparatus of claim 9 wherein the one or more coefficients in the one or more feature sub-classifiers can be mixed data types of logical relationships, decision tree, decision rules, weights of artificial neural networks, or numerical coefficient data in analytical formula when more than one classification or prediction structure is used for the one or more feature sub-classifiers.

25. A method for producing a frame class and a rate for a destination codec in a transcoding process from a source codec to the destination codec without reconstructing a voice signal, the method comprising:

extracting one or more parameters from a source bitstream coded in the source codec;

retrieving one or more intermediate data parameters associated with one or more previous frames from a buffer;

processing the one or more parameters and the one or more intermediate data parameters utilizing a classification process, wherein the classification process has pre-determined coefficients and paths, the pre-determined coefficients and paths being associated with a training process; and outputting a frame class and a rate decision for the destination codec.

26. The method of claim 25 wherein the destination voice codec and the source voice codec are the same.

27. The method of claim 25 wherein processing further comprises processing past classification input parameters.

28. The method of claim 25 wherein processing further comprises processing past classification output parameters.

29. The method of claim 25 wherein processing further comprises processing past intermediate parameters within the classification process.

30. The method of claim 25 wherein processing comprises a direct pass-through of one or more input parameters.

31. The method of claim 25 wherein extracting one or more parameters from the source bitstream coded in the source codec comprises:

determining a source code into component codes associated with one or more parameters;

processing the component codes using an unquantizing process to determine the one or more parameters; and selecting one or more inputs parameters from the one or more parameters as inputs in the classification process.

32. The method of claim 31 wherein the component codes are unquantized in accordance with the one or more parameters from the source codec to produce one or more intermediate speech parameters selected from one or more features including a plurality of pitch gains, a plurality of pitch lags, a plurality of fixed codebook gains, a plurality of line spectral frequencies, and a bit rate.

33. The method of claim 25 wherein the classification process comprises:

receiving one or more parameters from a source bitstream unpacker;

classifying N parameters using M sub-classifiers of the classification process;

processing outputs of the M sub-classifiers to produce a frame class, a rate and classification feature parameters; and providing the frame class, the rate, and classification feature parameters to a destination codec.

34. The method of claim 33 wherein each of the M sub-classifier is derived from a pattern classification process.

35. The method of claim 33 wherein each of the M sub-classifiers is derived using a large training set of input speech parameters and desired output classes and rates.

* * * * *